United States Patent [19]

Kiel

[11] Patent Number: 5,193,310
[45] Date of Patent: Mar. 16, 1993

[54] SNAP-LOCK SEAL RETAINER

[75] Inventor: Lowell M. Kiel, Seymour, Ind.

[73] Assignee: The Standard Products Company, Cleveland, Ohio

[21] Appl. No.: 766,431

[22] Filed: Sep. 26, 1991

[51] Int. Cl.$^5$ .............................................. E06B 3/00
[52] U.S. Cl. ................................ 49/501; 49/478.1; 49/493.1; 49/506
[58] Field of Search ............... 49/478, 501, 489, 493, 49/DIG. 1, 506

[56] References Cited

U.S. PATENT DOCUMENTS

| | | | |
|---|---|---|---|
| 3,126,590 | 3/1964 | Monti | 49/478 |
| 3,137,900 | 6/1964 | Carbary | 49/478 |
| 3,226,367 | 12/1965 | Monti | 49/489 X |
| 3,289,352 | 12/1966 | Heilweil et al. | 49/478 X |
| 3,378,957 | 4/1968 | Frehse | 49/478 X |
| 4,053,972 | 10/1977 | Kordes | 49/501 X |
| 4,644,698 | 2/1987 | Gerdes et al. | 49/493 X |
| 4,818,043 | 4/1989 | Borgen . | |
| 4,820,885 | 4/1989 | Lindsay . | |
| 4,831,780 | 5/1989 | Bockwinkel . | |
| 4,832,396 | 5/1989 | Moreno et al. . | |
| 4,852,303 | 8/1989 | Rolek . | |
| 4,878,368 | 11/1989 | Toutant et al. . | |
| 4,882,821 | 11/1989 | Sims, Jr. . | |
| 4,891,626 | 1/1990 | Neuman . | |
| 4,891,912 | 1/1990 | Bockwinkel . | |
| 4,912,359 | 3/1990 | Offutt et al. . | |
| 4,916,864 | 4/1990 | Thompson . | |
| 4,922,658 | 5/1990 | Coddens . | |
| 4,932,730 | 6/1990 | Zeismann et al. . | |
| 4,941,289 | 7/1990 | Rolek . | |
| 4,947,584 | 8/1990 | Wexler . | |
| 4,947,585 | 8/1990 | Guetle, Jr. . | |
| 4,960,254 | 10/1990 | Hartke . | |
| 4,967,511 | 11/1990 | Werginz et al. . | |
| 4,974,366 | 12/1990 | Tizzoni . | |
| 4,977,705 | 12/1990 | Guetle, Jr. . | |
| 4,996,793 | 3/1991 | Mazur . | |
| 4,999,951 | 3/1991 | Keys et al. . | |

FOREIGN PATENT DOCUMENTS 1025365   1/1953   France .................. 49/478

Primary Examiner—Philip C. Kannan
Attorney, Agent, or Firm—Harness, Dickey & Pierce

[57] ABSTRACT

A retainer for use in assembling door elements, such as shell, pan and gasket portions of a door associated with refrigerators, freezers and other thermally insulated cabinets, without requiring separate mechanical fasteners such as screws or rivets. The retainer comprises an extruded base and first leg which clip onto the edge of an outer shell of the door. The extruded base is formed with a hinge and a second leg which rotates open to allow placement of the pan of the door. The second leg rotates on the hinge about its longitudinal axis and locks in place to retain the door pan. The second leg is formed with a retaining chamber which accepts a flexible dart to secure the gasket of the door.

20 Claims, 3 Drawing Sheets

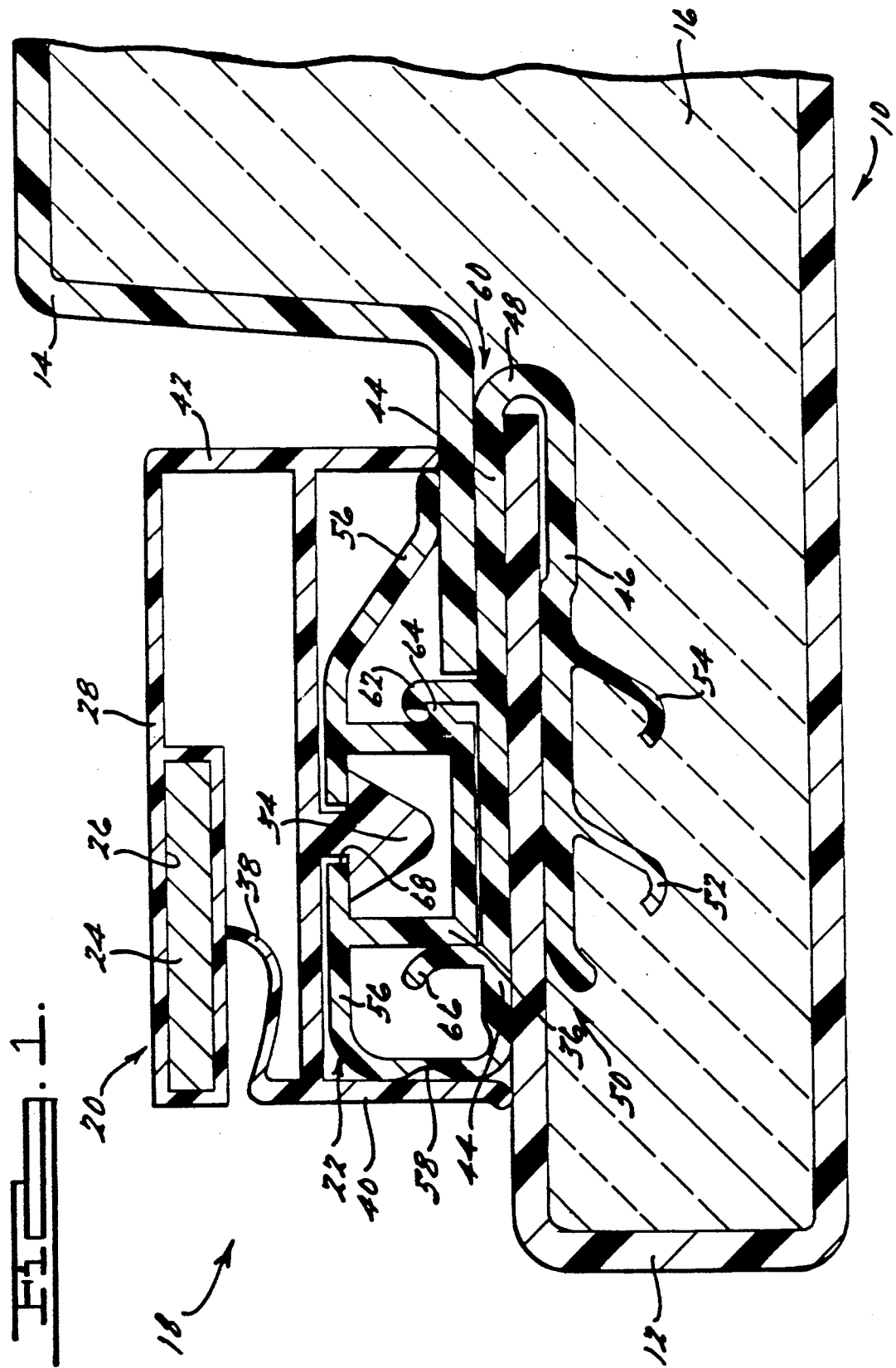

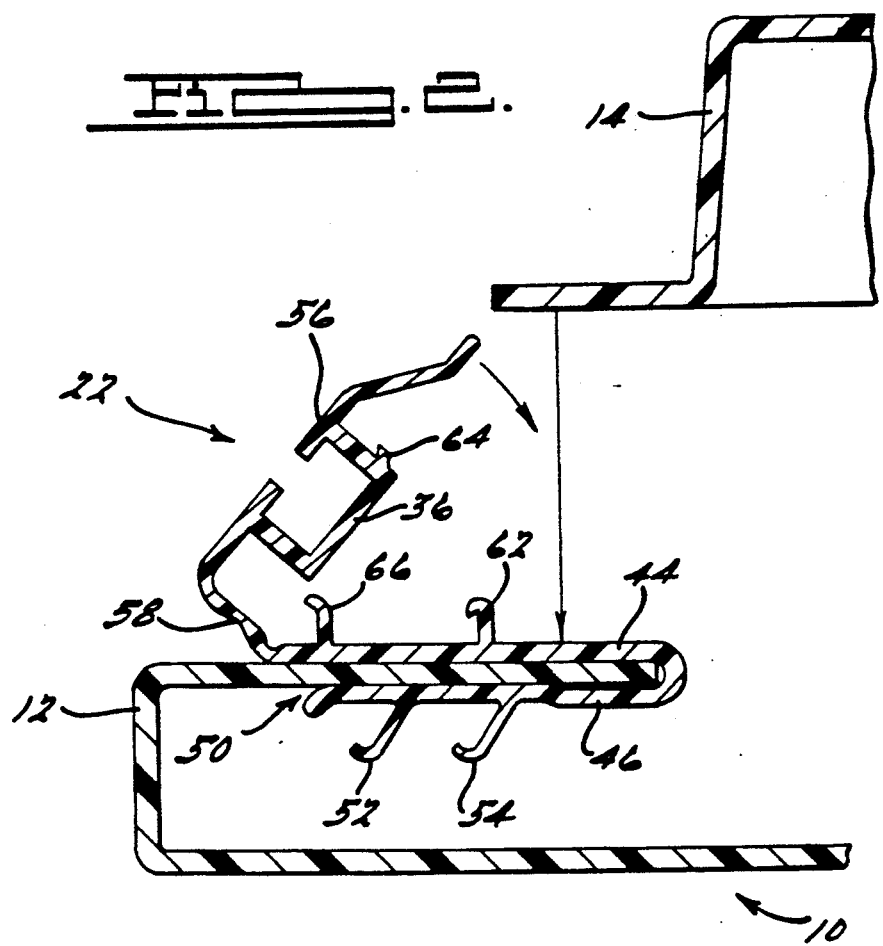
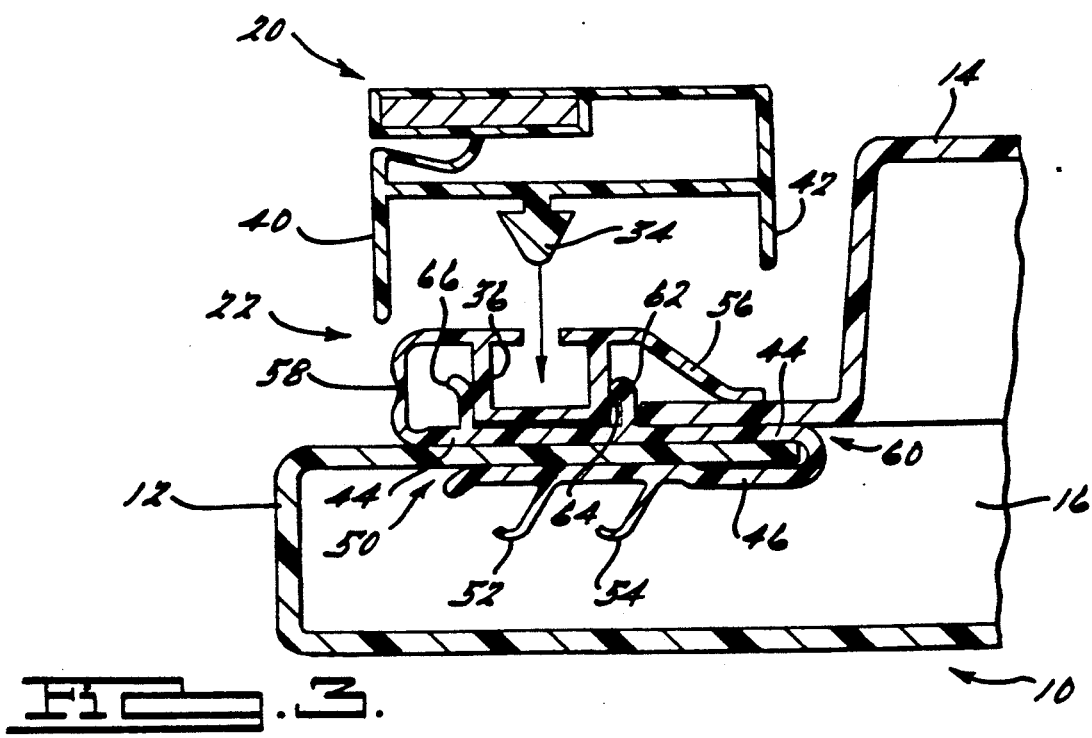

SNAP-LOCK SEAL RETAINER

BACKGROUND OF THE INVENTION

The present invention relates to refrigerators, freezers and other thermally insulated containers, provided with one or more doors which are adapted to close the access opening of the container. In particular, the present invention relates to a retainer for use in assembling the pan, shell, and gasket portions of the door without the need for separate mechanical fasteners, such as screws or rivets.

A refrigerator door is generally constructed of a metal outer shell, an injection molded plastic pan, an elastic magnetic gasket, insulation, and a means for assembling and fastening these elements. Numerous techniques and devices for assembling the components of a refrigerator door are known in the art. These devices generally involve multiple pieces, as well as the use of separate mechanical fasteners. The use of these separate fasteners often requires numerous holes to be drilled. As a result, assembly of the door is a complicated, multiple step operation, and results in low repeatability, high cost, and flaws in manufacture.

Although these conventional methods of attaching the door components have been acceptable in the art thus far, it is desirable to provide a simple, one-piece retainer to fasten the pan, shell, and gasket portions of the door.

SUMMARY OF THE INVENTION

In particular, the present invention provides a retainer for use in assembling pan, shell, and gasket portions of the door. This retainer consists of one piece only, and requires no separate fasteners. The retainer is constructed with a base and two legs connected to the opposite ends of the base by means of two U-shaped portions and extending in opposite directions. The retainer thus forms generally an "S" shape. The base and first leg form a first slot to accept the edge of the outer shell of a refrigerator door. The base and second leg form a second slot to accept the edge of the pan portion of the door.

The first leg is formed with at least one anchoring rib which extends into the insulation of the door, and prevents removal of the retainer from the door shell. The second leg is provided with a hinge portion having reduced wall thickness, so that the second leg may be rotated about the base. This hinge allows the second leg to rotate open to enable easy placement of the door pan, and allows the second leg to rotate closed to retain the door pan in place. The second leg is further provided with a receiving chamber which is formed to accept a flexible dart on the door gasket. The second leg and the base are formed with cooperating locking means for locking the second leg to the base, and thus retaining the door pan.

It is an object of the present invention to provide a retainer for use in assembling a refrigerator door.

It is a further object of the present invention to provide an integral, one-piece retainer to fasten the outer shell, pan, and gasket of a refrigerator door.

It is a further object of the present invention to provide a retainer which fastens the elements of a door without the need for separate mechanical fasteners.

These and other advantages and features will become apparent from the following description and claims in conjunction with the accompanying drawings.

BRIEF DESCRIPTION OF THE DRAWINGS

FIG. 1 is a sectional view of the retainer according to the present invention;

FIGS. 2 and 3 are diagrammatic views, in section, showing the assembly of the pan, shell, and gasket portions of a refrigerator door using the retainer according to the present invention;

DETAILED DESCRIPTION OF THE PREFERRED EMBODIMENT

Figure 4:
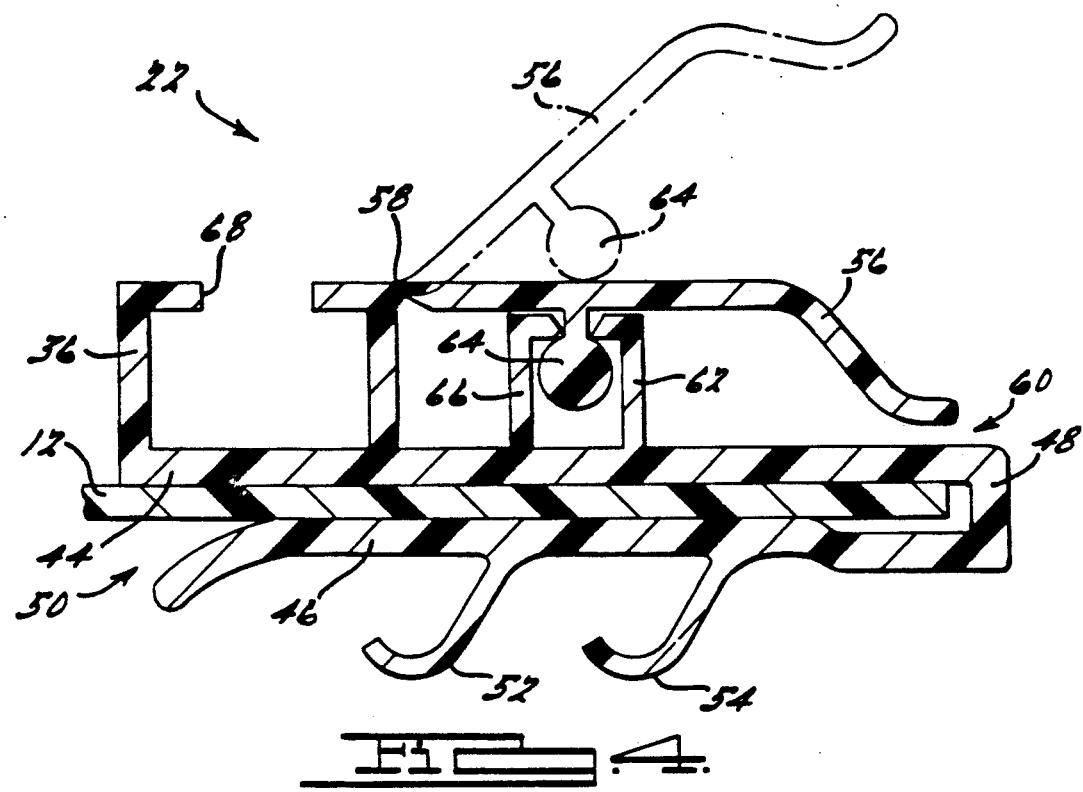
FIG. 4 is a sectional view of an alternative embodiment of the invention.

With reference to the drawings, FIG. 1 shows a typical refrigerator door 10 which is comprised of an outer shell portion 12 and an inner liner portion or pan 14. Generally, the shell portion 12 is made of metal, whereas the pan 14 is made of injection molded plastic. Insulation 16 is inserted into the volume defined by the shell 12 and pan 14. Completing the door 10 is a gasket assembly 18 surrounding the perimeter of the inside of the door 10. As is now known in the art, gasket assembly 18 retains the door 10 in the closed position and allows the door 10 to be periodically opened.

In particular, as seen in FIG. 1, gasket assembly 18 comprises elongated extrusion gasket 20 and elongated extrusion retainer 22. Extrusion gasket 20 includes flexible magnet 24 contained within pocket 26, which has face 28 adapted to contact the outer face 30 of the cabinet 32. Extrusion gasket 20 has a dart portion 34 that is received within chamber 36 of the extrusion retainer 22 in a manner known in the art. Between the dart portion 34 and the magnetic portion 26 is a flexible portion 38, which urges face 28 into contact with the outer face 30. Ribs or legs 40 and 42 rest on the shell 12 and pan 14, respectively, and provide support for gasket 20 when the door 10 is closed.

Extrusion retainer 22 fastens the pan 12, shell 14, and gasket 20 without the need for separate mechanical fasteners. Extrusion retainer 22 acts as a fastener for use in assembling the pan portion 12 and shell portion 14 of the refrigerator door 10. In addition, extrusion retainer 22 provides the means for mounting the gasket extrusion 20 to the refrigerator door 10.

Retainer extrusion 22 includes a base portion 44. A first leg 46 is formed integrally with the base portion 44, and is connected to the base portion 44 by means of the U-shaped web portion 48. The first leg 46 is spaced apart from the lower face of the base portion 44 and defines with the base portion 44 a first channel 50 into which the edge of the shell portion 12 is inserted. In a preferred embodiment of the invention, first leg 46 is biased toward the lower face of the base portion 44, with the U-shaped web portion 48 acting as a spring, so that the base portion 44 and first leg portion 46 provide a U-shaped clip that grips the shell portion 12 inserted therein. The first leg 46 is preferably formed with two anchoring ribs 52 and 54, which extend into insulation 16 and prevent removal of extrusion retainer 22 from outer shell 12.

Spaced apart from the upper face of base portion 44 is a second leg 56. Second leg 56 is formed onto base 44 and may be rotated with respect to base 44 about the longitudinal, extruded axis of the retainer by means of hinge portion 58. Hinge 58 comprises a U-shaped web portion having a narrower wall thickness than first leg 46, second leg 56, and base 44. In the position shown in FIG. 1, the second leg 56 and the base portion 44 together form a second channel 60 that is open in the opposite direction from first channel 50 for receiving the shell portion 14 of the door 10.

Retainer extrusion 22 is maintained in the closed, locked position shown in FIG. 1 by means of the interengaging lock portions 62 and 64 carried by the base portion 44 and the chamber walls 36, respectively. Chamber walls 36 are carried by the second leg 56. Base portion 44 also carries the backstop rib 66, which prevents lateral deformation of the chamber 36.

Gasket extrusion 20 creates a magnetic seal between door 10 and cabinet 32 by means of magnet 24. Force exerted on door 10 to open the door urges the retainer extrusion 22 away from gasket extrusion 20 until the magnetic seal is broken. Dart 34 formed on gasket extrusion 20 resists being withdrawn from chamber 36 by reason of the large size of the base of dart 34 relative to the size of the opening 68 to chamber 36. With reference to FIG. 5, the gasket extrusion 20 will provide additional resistance, greater than the gasket shown in FIGS. 1 and 4, to being disengaged from the retainer 22, due the opening 68 imparting a shear force upon the shaft of dart 34 when the door 10 is opened.

FIG. 1 shows the space between the outer shell 12 and the inner liner or pan 14 as completely filled with insulation 16, such as would result from inserting a foamable plastic insulation within the interior of the door 10 and causing the foamable material to foam and harden within the door panels 12 and 14. Alternatively, insulation 16 may be provided by glass fiber batting that is pressed against the inside of the door 10. As is known, the batting contacts the inside surfaces of the outer shell 12 and pan 14.

FIGS. 2 and 3 illustrate the use of the retainer extrusion 22 in assembling a refrigerator door according to the present invention. The retainer extrusion 22 fits onto the shell portion 12 as shown in FIG. 2, with the leading edge of the shell 12 inserted into first channel 50. Four elongated segments of the retainer extrusion 22 are thus attached to the generally rectangular opening (not shown) in the door's outer shell 12, so as to form a frame around the opening in the outer shell 12. The pan 14 is then placed on the upper surface of the base portion 44, with the locking rib 62 assisting in aligning the pan 14 on the upper surface of the base portion 44. As seen in FIG. 2, the second leg 56 is widely spaced from the upper surface of the base portion 44 to allow placement of the pan 14. After the pan 14 is placed on the upper surface of the base portion 44, the second leg 56 is swung towards the base portion 44 in the direction shown by the arrow in FIG. 2, rotating about the longitudinal, extruded axis of the retainer. Second leg 56 then engages the locking means 62 and 64, as in the position shown in FIG. 3. To facilitate the rotation of the second leg 56 from the open position shown in FIG. 2 to the closed, locked position shown in FIG. 3, the retainer extrusion 22 has a hinge portion 58 of reduced thickness, which acts as a hinge about which the second leg 56 may be rotated. The top of the locking rib 62 and the bottom of the locking rib surface 64 may be provided with cooperating cam surfaces to enable the locking means 62 and 64 to be moved into the locked position shown in FIGS. 1 and 3, and to prevent the locking means 62 and 64 from unlocking. Backstop rib 66 complete the locking means and prevents lateral deformation of chamber 36 to the left, which might otherwise allow the second leg 56 to become unlocked.

If the insulation 16 is provided by glass fiber batting, then it will be already in place before the pan 14 is placed upon the upper surface of the base portion 44 as shown in FIG. 2. If the insulation 16 is foamed in place, then the foamable mixture will be injected into the door 10 after assembly of the pan 14 to the shell 12 as shown in FIG. 3.

After second leg 56 is locked to the base 44, the gasket extrusion 20 is snapped into the retainer extrusion 22 by forcing the dart 34 into chamber 36. Gasket extrusion 20 is provided in the form of a square or, more usually, a rectangular frame that is formed by heat welding together segments of the gasket extrusion 20 that have been provided with mitered corners, as is well known in the art.

Figure 5:
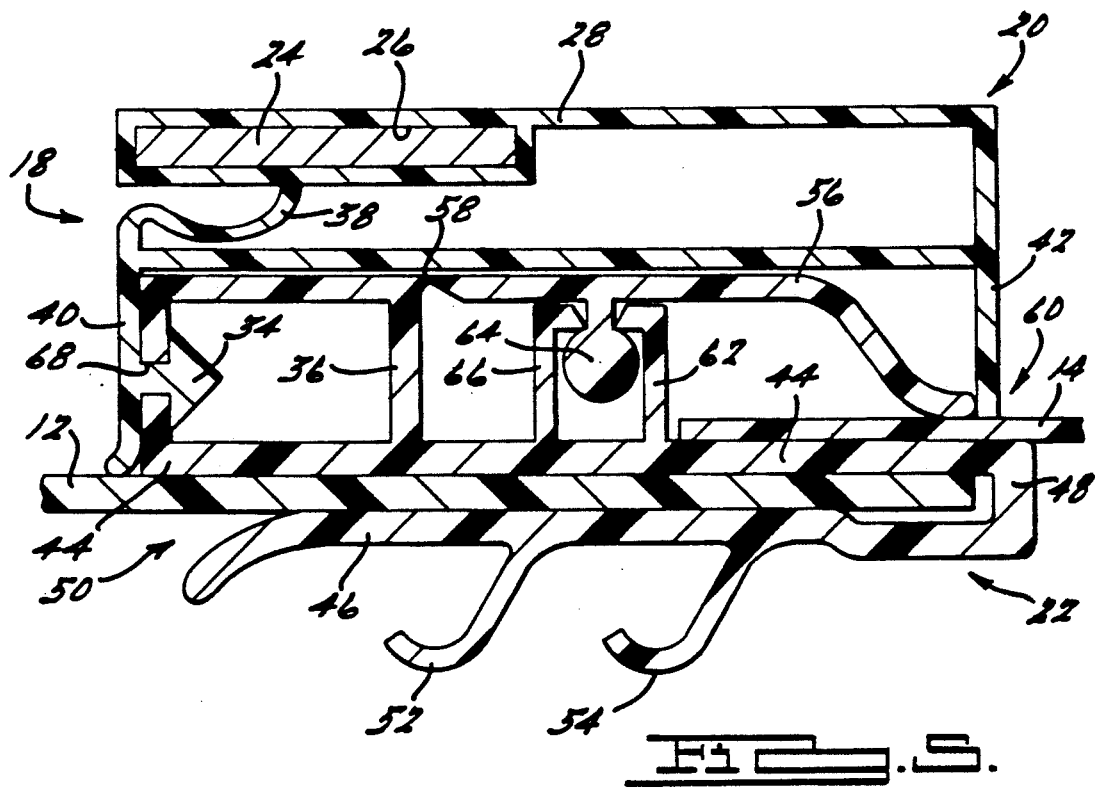
FIG. 5 is a sectional view of another alternative embodiment of the invention, showing assembly of the gasket portion.

FIG. 4 shows an alternative embodiment of retainer 22, in which the dotted line shows the open position of the second leg 56 in the form it assumes when it is extruded. In the embodiment shown in FIG. 4, chamber 36 is formed at the end of the base member 44 which is opposite the U-shaped web portion 48. Chamber 36 functions to receive and hold the dart 36 of gasket extrusion 20. The locking ribs 62 and 64 are carried by the base portion 44 and form cooperating locking means with the longitudinally extending dart or ring 64 carried by the underside of the second leg 56. When the second leg 56 is rotated about the hinge toward the upper surface of the base portion 44, the longitudinally extending ring 64 will force apart the ribs 62 and 66 to permit the ring 64 to be held between the ribs 62 and 66, and thus be locked in place. If it is deemed desirable to provide for disengagement of the locking means 62, 64 and 66, then the locking ribs 62 and 66 can be provided with suitable cam surfaces as shown in FIG. 5 to cooperate with the curved surface of the ring 64 so as to allow the ring 64 to be moved between the open, unlocked position shown in dotted line in FIG. 4 and the closed, locked position shown in solid line.

The retainer 22 of FIG. 5 is the retainer 22 of FIG. 4, modified so that chamber 36 has an opening 68 on the side wall 58, for entry of dart 34 which is located on the side rib or leg 62. When door 10 is opened, the forces acting on dart 34 will not be aligned with opening 68. As a result, the opening 68 imposes a shear force on the shaft of the dart on gasket extrusion 20 shown in FIG. 5, resulting in greater resistance to being withdrawn from retainer 22.

It should be understood that various modifications of the preferred embodiment will become apparent to those skilled in the art after a study of the specification, drawings, and the following claims.

What is claimed is:

1. A retaining device, comprising:
    an elongated base having longitudinal and lateral axes;
    a first leg extending laterally substantially parallel to said base, said first leg connected to said base by a first web portion, an outer shell of a door, said base and said first leg forming a first channel for receiving the flange edge of said outer shell of said door;
    a second leg connected to said base by a second web portion, a pan portion of a door, said second leg and said base forming a second channel for receiving the flange edge of said pan portion of said door, said second channel opening in a substantially opposite direction from said first channel;

said second web portion being formed with a hinge, said hinge allowing said second leg to rotate about said longitudinal axis with respect to said base and said first leg;

a door gasket, said second leg being formed with a fastening means for securing said door gasket to said retaining device; and said base and said second leg having a locking means such the said base and said second leg secure said pan portion, said locking means adapted to prevent rotation of said second leg about said longitudinal axis.

2. The retaining device as set forth in claim 1, wherein said first leg is biased toward said base, such that said first web portion acts as a spring, such that said base and said first leg provide a clip that grips said outer shell of said door.

3. The retaining device as set forth in claim 1, wherein said first leg is formed with at least one anchoring rib extending away from said first leg and said base.

4. The retaining device as set forth in claim 3, wherein said door comprises insulation material inserted into said door, said anchoring rib extending into said insulation so as to prevent removal of said retaining device from said outer shell of said door, and to prevent lateral movement of said retaining device.

5. The retaining device as set forth in claim 4, wherein said insulation comprises foamable plastic insulation.

6. The retaining device as set forth in claim 4, wherein said insulation comprises glass fiber batting insulation that is pressed against the outer shell of said door.

7. The retaining device as set forth in claim 1, wherein said base is formed with two lateral ends; said first leg being connected to the first end of said base; said second leg being connected to the second end of said base; said first leg and said second leg extending laterally in substantially opposite directions.

8. The retaining device as set forth in claim 1, wherein said first web portion comprises a first U-shaped member, said second web portion comprising a second U-shaped member.

9. The retaining device as set forth in claim 1, wherein said hinge comprises a hinge member formed on said second web portion, said hinge having reduced wall thickness relative to said base, said first leg, and said second leg.

10. The retaining device as set forth in claim 1, wherein said locking means comprises a backstop rib and locking rib formed on said base, said second leg having a locking rib surface;

said locking rib and said locking rib surface being formed so as to engage with said locking rib and prevent rotation of said second leg about said longitudinal axis;

said backstop rib adapted to prevent lateral deformation of said chamber, prevent locking means from unlocking, and prevent rotation of said second leg about said longitudinal axis.

11. The retaining device as set forth in claim 1, wherein said locking rib and locking surface are formed with cooperating cam surfaces, said cam surfaces formed so as to enable said locking means to move into a locked position and to prevent said locking means from unlocking.

12. The retaining device as set forth in claim 1, wherein said locking means are provided with cooperating cam surfaces, so as to allow disengagement of said locking means.

13. The retaining device as set forth in claim 1, wherein said fastening means comprises an aperture and chamber formed on said second leg, said door gasket having a flexible dart, said aperture and chamber adapted to accept said flexible dart.

14. A retaining device, comprising:

an elongated base having longitudinal and lateral axes, said base having two lateral ends;

said base formed with a backstop rib and a locking rib;

a first leg extending laterally substantially parallel to said base, said first leg connected to one end of said base by means of a first U-shaped web portion, an outer shell of a door, said base and said first leg forming a first channel opening laterally for receiving the flange edge of said outer shell of said door;

a second leg connected to said base at the opposite end from said first leg by means of a second U-shaped web portion, said second leg extending laterally in substantially the opposite direction from said first leg, a pan portion of a door, said second leg and said base forming a second channel opening laterally for receiving the flange edge of said pan portion of said door, said first channel and said second channel opening laterally in substantially opposite directions;

said second U-shaped web portion being formed with a hinge having reduced wall thickness relative to said base said first leg, and said second leg, said hinge allowing said second leg to rotate about said longitudinal axis with respect to said base and said first leg;

said second leg being formed with an aperture and a receiving chamber, a door gasket having a flexible dart, said aperture and chamber being adapted to accept said flexible dart formed on said gasket to secure said gasket to said second leg of said retaining device;

said second leg being formed with a locking rib surface adapted to engage said locking rib formed on said base, such that said base and said second leg secure said pan portion, said locking rib and locking rib surface adapted to prevent rotation of said second leg about said longitudinal axis; and said backstop rib formed on said base adapted to prevent lateral movement of said chamber.

15. The retaining device as set forth in claim 14, wherein said first leg is biased toward said base, such that said first web portion acts as a spring, such that said base and said first leg provide a clip that grips said outer shell of said door.

16. The retaining device as set forth in claim 14, wherein said first leg is formed with at least one anchoring rib extending away from said first leg and said base.

17. The retaining device as set forth in claim 16, wherein said door comprises insulation material inserted into said door, said anchoring rib extending into said insulation so as to prevent removal of said retaining device from said outer shell of said door, and to prevent lateral movement of said retaining device.

18. The retaining device as set forth in claim 14, wherein said locking rib and said locking rib surface are provided with cooperating cam surfaces, so as to allow disengagement of said locking rib and locking rib surface.

19. A method of assembling a door comprising the steps of:
   clipping an extruded retainer onto an outer shell of said door;
   placing a door pan in contact with said retainer;
   rotating a leg portion of said retainer with respect to said door shell and said door pan;
   locking said leg portion in a closed position to secure said door pan;
   inserting a flexible dart formed on a gasket into a receiving chamber formed on said leg portion of said retainer; and
   inserting insulation between said door pan and said outer shell.

20. The method as set forth in claim 19, wherein the insulation is inserted into the outer shell of the door prior to placing the door pan in contact with the retainer.

* * * * *

UNITED STATES PATENT AND TRADEMARK OFFICE
CERTIFICATE OF CORRECTION

PATENT NO. : 5,193,310
DATED : March 16, 1993
INVENTOR(S) : Lowell M. Kiel

It is certified that error appears in the above-identified patent and that said Letters Patent is hereby corrected as shown below:

Column 3, line 28, after "due" insert --to--

Column 4, line 3, "complete" should be --completes--

Column 5, line 12, claim 1, "the" should be --that--

Signed and Sealed this

Eleventh Day of January, 1994

*Attest:*

BRUCE LEHMAN

*Attesting Officer*     *Commissioner of Patents and Trademarks*